(12) United States Patent
Hamamoto et al.

(10) Patent No.: US 6,479,191 B1
(45) Date of Patent: Nov. 12, 2002

(54) ELECTROLYTE HAVING ALKYNE DERIVATIVE AND LITHIUM SECONDARY BATTERY USING THE SAME

(75) Inventors: Toshikazu Hamamoto; Koji Abe; Tsutomu Takai; Yasuo Matsumori; Akikazu Ito, all of Ube (JP)

(73) Assignee: Ube Industries, Ltd., Ube (JP)

( * ) Notice: Subject to any disclaimer, the term of this patent is extended or adjusted under 35 U.S.C. 154(b) by 63 days.

(21) Appl. No.: 09/598,112

(22) Filed: Jun. 21, 2000

(30) Foreign Application Priority Data

Apr. 28, 2000 (JP) ........................................ 2000-129073

(51) Int. Cl.$^7$ ................................................ H01M 6/16
(52) U.S. Cl. ...................................... 429/326; 252/62.2
(58) Field of Search ........................ 252/62.2; 429/188, 429/306, 307, 324, 326, 333, 340

(56) References Cited

FOREIGN PATENT DOCUMENTS

| JP | 06-223875 A | * | 8/1994 |
| JP | 11-273723 A | * | 10/1999 |
| JP | 11-273724 A | * | 10/1999 |
| JP | 11-273725 A | * | 10/1999 |

* cited by examiner

*Primary Examiner*—Patrick Ryan
*Assistant Examiner*—Susy Tsang-Foster
(74) *Attorney, Agent, or Firm*—Morgan, Lewis & Bockius LLP

(57) ABSTRACT

An electrolyte for a lithium secondary battery comprising (i) a non-aqueous solvent, especially consists essentially of a high dielectric solvent and a low viscosity solvent, and (ii) an electrolyte salt, dissolved therein and (iii) an alkyne derivative or an alkyne carbonate derivative and also a lithium secondary battery using the same are disclosed.

24 Claims, No Drawings

ELECTROLYTE HAVING ALKYNE DERIVATIVE AND LITHIUM SECONDARY BATTERY USING THE SAME

BACKGROUND OF THE INVENTION

1. Field of the Invention

The present invention relates to a novel electrolyte for a lithium secondary battery capable of providing a lithium secondary battery having superior battery cycle characteristics and battery characteristics such as electrical capacity, storage characteristics, and also relates to a lithium secondary battery using the same.

2. Description of the Related Art

In recent years, lithium secondary batteries have been widely used as the power sources for driving compact electronic devices etc. Lithium secondary batteries are mainly composed of a cathode, a non-aqueous electrolyte and an anode. In particular, a lithium secondary battery having a lithium complex oxide such as $LiCoO_2$ as a cathode and a carbonaceous material or lithium metal as an anode is suitably used. Further, as the electrolyte for a lithium secondary battery, a cyclic carbonate such as ethylene carbonate (EC) or propylene carbonate (PC) is suitably used.

However, a secondary battery having an even more superior battery cycle characteristics and battery characteristics such as the electrical capacity is desired.

A lithium secondary battery using, as the cathode active material, for example, $LiCoO_2$, $LiMn_2O_4$, $LiNiO_2$, etc, suffers from a decrease in the battery performance since the solvent in the non-aqueous electrolyte is locally partially oxidized and decomposed at the time of charging and the decomposed products inhibit the desirable electrochemical reaction of the battery. This is believed to be due to the electrochemical oxidation of the solvent at the interface between the cathode active material and the non-aqueous electrolyte.

Further, a lithium secondary battery using a highly crystallized carbonaceous material such as natural graphite or artificial graphite, as an anode active material, sometimes suffers from peeling of the carbonaceous anode material which, depending on the extent of the phenomenon, makes the capacity irreversible. This peeling occurs due to the decomposition of the solvent in the electrolyte during charging, that is, is due to the electrochemical reduction of the solvent at the interface of the carbonaceous anode material and electrolyte. In particular, PC having a low melting point and high dielectric constant, has a high electroconductivity even at a low temperature. Nevertheless, when a graphite anode is used, there are problems that the PC cannot be used for the lithium secondary battery due to the decomposition thereof. Further, EC partially decomposes during the repeated charging and discharging thereof so that the battery performance is decreased. Therefore, the battery cycle characteristics and the battery characteristics such as the electrical capacity are not necessarily satisfactory at the present time.

SUMMARY OF THE INVENTION

The objects of the present invention are to solve the above-mentioned problems relating to an electrolyte for a lithium secondary battery and provide a non-aqueous electrolyte for a lithium secondary battery having superior battery cycle characteristics and battery characteristics such as electrical capacity and a lithium secondary battery using the same.

In accordance with the present invention, there is provided an electrolyte for a lithium secondary battery comprising (i) a non-aqueous solvent, (ii) an electrolyte salt dissolved therein and (iii) at least one alkyne derivative having the formulae (I), (II) and (III) or at least one alkyne carbonate derivative having the formula (IV):

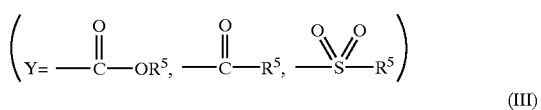

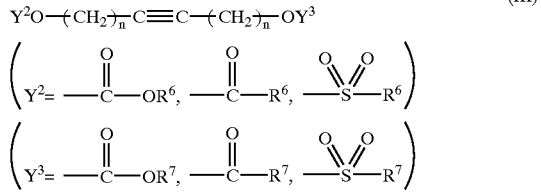

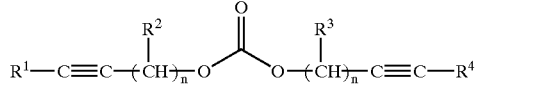

wherein $R^1$, $R^2$, $R^3$ and $R^4$ independently indicate a $C_1$ to $C_{12}$ alkyl group, a $C_3$ to $C_6$ cycloalkyl group, a aryl group, or hydrogen atom, $R^5$, $R^6$ and $R^7$ in $Y^1$, $Y^2$, and $Y^3$ independently indicate a $C_1$ to $C_{12}$ alkyl group, a $C_3$ to $C_6$ cycloalkyl group, or aryl group, and n is an integer of 1 or 2.

In accordance with the present invention, there is also provided a lithium secondary battery comprising (a) a cathode, (b) an anode, and (c) an electrolyte comprising (i) a non-aqueous solvent, (ii) an electrolyte salt dissolved therein and (iii) at least one alkyne derivative having the formulae (I), (II) and (III) or at least one alkyne carbonate derivative having the formula (IV):

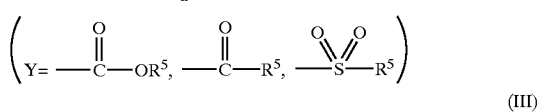

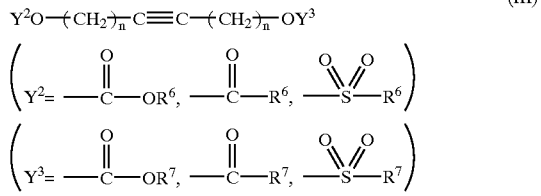

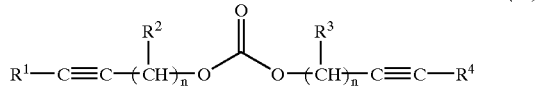

wherein $R^1$, $R^2$, $R^3$ and $R^4$ independently indicate a $C_1$ to $C_{12}$ alkyl group, $C_3$ to $C_6$ cycloalkyl group, aryl group, or hydrogen atom, $R^5$, $R^6$ and $R^7$ in $Y^1$, $Y^2$, and $Y^3$ independently indicate a $C_1$ to $C_{12}$ alkyl group, $C_3$ to $C_6$ cycloalkyl group, or aryl group, and n is an integer of 1 or 2.

BEST MODE FOR CARRYING OUT THE PRESENT INVENTION

The alkyne derivative contained in the electrolyte is reduced and decomposed, prior to the reduction and decomposition of the organic solvent, at the surface of the carbonaceous anode at the time of charging. A part of the decomposed product is believed to form a passivation film on the surface of the highly crystallized carbonaceous anode due to the activity of the natural graphite, artificial graphite, etc., whereby the reduction and decomposition of the organic solvent in the electrolyte are prevented in advance.

Further, a part of the decomposed product is believed to oxidize and decompose, prior to the reduction and decomposition of the organic solvent in the electrolyte at the slight excess voltage portion where the potential of the surface of the cathode material becomes high transitionally, whereby the oxidation and decomposition of the organic solvent in the electrolyte are prevented in advance.

Due to the above mechanism, it is believed there is the effect of suppressing decomposition of the electrolyte, without impairing normal reactions of the battery.

In the alkyne derivative contained in the electrolyte composed of the electrolyte salt dissolved in the non-aqueous solvent, $R^1$, $R^2$, $R^3$, and $R^4$ in the alkyne derivative of the formulae (I) and (II) are preferably, independently $C_1$ to $C_{12}$ alkyl groups such as a methyl group, ethyl group, propyl group, butyl group, pentyl group, hexyl group, octyl group and decyl group. The alkyl group may also be a branched alkyl group such as an isopropyl group or isobutyl group. Further, it may be a $C_3$ to $C_6$ cycloalkyl group such as a cyclopropyl group or cyclohexyl group. Further, it may include a $C_1$ to $C_{12}$ aryl group such as a phenyl group, benzyl group, or p-tolyl group. Further, a hydrogen atom is also possible.

Further, $R^5$, $R^6$, and $R^7$ in $Y^1$, $Y^2$, and $Y^3$ in the alkyne derivative of the general formulae (II) and (III) are preferably, independently from each other, a $C_1$ to $C_{12}$ alkyl group such as a methyl group, ethyl group, propyl group, butyl group, pentyl group, and hexyl group. Further, the alkyl group may be a branched alkyl group such as an isopropyl group or isobutyl group. Further, it may also be a $C_3$ to $C_6$ cycloalkyl group such as a cyclopropyl group or cyclohexyl group. Further, it may include a $C_1$ to $C_{12}$ aryl group such as a phenyl group, benzyl group, or p-tolyl group. However, n is an integer of 1 or 2.

The specific examples of the alkyne derivative having the formula (I) are 2-pentyne ($R^1$=a methyl group, $R^2$=a ethyl group), 1-hexyne ($R^1$=hydrogen atom, $R^2$=a butyl group), 2-hexyne ($R^1$=methyl group, $R^2$=propyl group), 3-hexyne ($R^1$=$R^2$=ethyl group), 1-heptyne ($R^1$=hydrogen atom, $R^2$=pentyl group), 1-octyne ($R^1$=hydrogen atom, $R^2$=hexyl group), 2-octyne ($R^1$=methyl group, $R^2$=pentyl group), 4-octyne ($R^1$=$R^2$=propyl group), 1-decyne ($R^1$=hydrogen atom, $R^2$=octyl group), 1-dodecyne ($R^1$=hydrogen atom, $R^2$=decyl group), phenylacetylene ($R^1$=phenyl group, $R^2$=hydrogen atom), 1-phenyl-1-propyne ($R^1$=phenyl group, $R^2$=methyl group), 1-phenyl-1-butyne ($R^1$=phenyl group, $R^2$=ethyl group), 1-phenyl-1-pentyne ($R^1$=phenyl group, $R^2$=propyl group), 1-phenyl-1-hexyne ($R^1$=phenyl group, $R^2$=butyl group), diphenylacetylene ($R^1$=$R^2$=phenyl group), 4-ethynyltoluene ($R^1$=p-tolyl group, $R^2$=hydrogen atom), dicyclohexylacetylene ($R^1$=$R^2$=cyclohexyl group), etc. However, the present invention is not limited to these compounds in any way.

Further, the specific examples of the alkyne derivative having the formula (II) are when $Y^1$=—$COOR^5$, 2-propynylmethyl carbonate ($R^3$=hydrogen atom, $R^4$=hydrogen atom, $R^5$=methyl group, n=1), 2-propynylethyl carbonate ($R^3$=hydrogen atom, $R^4$=hydrogen atom, $R^5$=ethyl group, n=1), 2-propynylpropyl carbonate ($R^3$=hydrogen atom, $R^4$=hydrogen atom, $R^5$=propyl group, n=1), 2-propynylbutyl carbonate ($R^3$=hydrogen atom, $R^4$=hydrogen atom, $R^5$=butyl group, n=1), 2-propynylphenyl carbonate ($R^3$=hydrogen atom, $R^4$=hydrogen atom, $R^5$=phenyl group, n=1), 2-propynylcyclohexyl carbonate ($R^3$=hydrogen atom, $R^4$=hydrogen atom, $R^5$=cyclohexyl group, n=1), 2-butynylmethyl carbonate ($R^3$=methyl group, $R^4$=hydrogen atom, $R^5$=methyl group, n=1), 3-butynylmethyl carbonate ($R^3$=hydrogen atom, $R^4$=hydrogen atom, $R^5$=methyl group, n=2), 2-pentynylmethyl carbonate ($R^3$=ethyl group, $R^4$=hydrogen group, $R^5$=methyl group, n=1), 1-methyl-2-butynylmethyl carbonate ($R^3$=methyl group, $R^4$=methyl group, $R^5$=methyl group, n=1), etc.

When $Y^1$=—$COR^5$, 2-propynyl acetate ($R^3$=hydrogen atom, $R^4$=hydrogen atom, $R^5$=methyl group, n=1), 2-propynyl propionate ($R^3$=hydrogen atom, $R^4$=hydrogen atom, $R^5$=ethyl group, n=1), 2-propynyl butyrate ($R^3$=hydrogen atom, $R^4$=hydrogen atom, $R^5$=propyl group, n=1), 2-propynyl benzoate ($R^3$=hydrogen atom, $R^4$=hydrogen atom, $R^5$=phenyl group, n=1), 2-propynylcyclohexyl carbonate ($R^3$=hydrogen atom, $R^4$=hydrogen atom, $R^5$=cyclohexyl group, n=1), 2-butynyl acetate ($R^3$=methyl group, $R^4$=hydrogen atom, $R^5$=methyl group, n=1), 3-butynyl acetate ($R^3$=hydrogen atom, $R^4$=hydrogen atom, $R^5$=methyl group, n=2), 2-pentynyl acetate ($R^3$=ethyl group, $R^4$=hydrogen group, $R^5$=methyl group, n=1), 1-methyl-2-butynyl acetate ($R^3$=methyl group, $R^4$=methyl group, $R^5$=methyl group, n=1), etc.

When $Y^1$=—$So_2R^5$, 2-propynyl methanesulfonate ($R^3$=hydrogen atom, $R^4$=hydrogen atom, $R^5$=methyl group, n=1), 2-propynyl ethanesulfonate ($R^3$=hydrogen atom, $R^4$=hydrogen atom, $R^5$=ethyl group, n=1), 2-propynyl propanesulfonate ($R^3$=hydrogen atom, $R^4$=hydrogen atom, $R^5$=propyl group, n=1), 2-propynyl p-toluenesulfonate ($R^3$=hydrogen atom, $R^4$=hydrogen atom, $R^5$=p-tolyl group, n=1), 2-propynyl cyclohexylsulfonate ($R^3$=hydrogen atom, $R^4$=hydrogen atom, $R^5$=cyclohexyl group, n=1), 2-butynyl methanesulfonate ($R^3$=methyl group, $R^4$=hydrogen atom, $R^5$=methyl group, n=1), 3-butynyl methanesulfonate ($R^3$=hydrogen atom, $R^4$=hydrogen atom, $R^5$=methyl group, n=2), 2-pentynyl methanesulfonate ($R^3$=ethyl group, $R^4$=hydrogen group, $R^5$=methyl group, n=1), 1-methyl-2-butynyl methanesulfonate ($R^3$=methyl group, $R^4$=methyl group, $R^5$=methyl group, n=1), etc. However, the present invention is not limited to these compounds in any way.

Further, the specific examples of the alkyne derivative having general formula (III) are when $Y^2$=—$COOR^6$ and/or $Y^3$=—$COOR^7$, 2-butyne-1,4-diol dimethyldicarbonate ($R^6$=$R^7$=methyl group, n is all 1), 2-butyne-1,4-diol diethyldicarbonate ($R^6$=$R^7$=ethyl group, n is all 1), 2-butyne-1,4-diol diphenyldicarbonate ($R^6$=$R^7$=phenyl group, n is all 1), 2-butyne-1,4-diol dicyclohexyldicarbonate ($R^6$=$R^7$=cyclohexyl group, n is all 1), etc.

When $Y^2$—$COR^6$ and/or $Y^3$=—$COR^7$, 2-butyne-1,4-diol diacetate ($R^6$=$R^7$=methyl group, n is all 1), 2-butyne-1,4- diol dipropionate ($R^6=R^7$=ethyl group, n is all 1), 2-butyne-1,4-diol dibenzoate ($R^6=R^7$=phenyl group, n is all 1), 2-butyne-1,4-diol dicyclohexanecarboxylate ($R^6=R^7$=cyclohexyl group, n is all 1), etc.

When $Y^2$—$SO_2R^6$ and/or $Y^3$=—$SO_2R^7$, 2-butyne-1,4-diol dimethanesulfonate ($R^6=R^7$=methyl group, n is all 1), 2-butyne-1,4-diol dipropanesulfonate ($R^6=R^7$=propyl group, n is all 1), 2-butyne-1,4-diol di-p-toluenesulfonate ($R^6=R^7$=p-tolyl group, n is all 1), 2-butyne-1,4-diol dicyclohexanesulfonate ($R^6=R^7$=cyclohexyl group, n is all 1), etc. However, the present invention is not limited to these compounds in any way.

In the alkyne derivatives, if the content of the alkyne derivative having the formulae (I), (II) and (III) is too large, the conductivity of the electrolyte etc. change and the battery performance is decreased in some cases. Further, if too small, a sufficient coating is not formed and the expected battery performance is not obtained. Therefore, the content is preferably in the range of 0.01 to 20% by weight, particularly 0.1 to 10% by weight, based upon the weight of the electrolyte.

The alkyne carbonate derivative contained in the electrolyte is reduced and decomposed, prior to the reduction and decomposition of the organic solvent in the electrolyte, at the surface of the carbonaceous anode at the time of charging. A part of the decomposed product is believed to form a passivation film on the surface of the highly crystallized carbonaceous anode due to the activity of the natural graphite, artificial graphite, etc., whereby the reduction and decomposition of the organic solvent in the electrolyte are prevented in advance.

Further, a part of the decomposed product is believed to oxidize and decompose, prior to the reduction and decomposition of the organic solvent in the electrolyte at the slight excess voltage portion where the potential of the surface of the cathode material becomes high transitionally, whereby the oxidation and decomposition of the organic solvent in the electrolyte are prevented in advance.

Due to the above mechanism, it is believed there is the effect of suppressing decomposition of the electrolyte, without impairing normal reactions of the battery.

In the alkyne carbonate derivative contained in the electrolyte composed of the electrolyte salt dissolved in the non-aqueous solvent, $R^1$, $R^2$, $R^3$, and $R^4$ in the alkyne carbonate derivative of the general formula (IV) are preferably, independently from each other, a $C_1$ to $C_{12}$ alkyl group such as a methyl group, ethyl group, propyl group, butyl group, pentyl group, and hexyl group. The alkyl group may also be a branched alkyl group such as an isopropyl group or isobutyl group. Further, it may be a $C_3$ to $C_6$ cycloalkyl group such as a cyclopropyl group or cyclohexyl group. Further, it may include a $C_1$ to $C_{12}$ aryl group such as a phenyl group, benzyl group, or p-tolyl group. Further, a hydrogen atom is also possible and n is an integer of 1 or 2.

The specific examples of the alkyne carbonate derivative having the general formula (IV) are dipropargyl carbonate ($R^1=R^2=R^3=R^4$=hydrogen atom, n=1), di(2-butynyl)carbonate ($R^1=R^4$=methyl group, $R^2=R^3$=hydrogen atom, n=1), di(3-butynyl)carbonate ($R^1=R^2=R^3=R^4$=hydrogen atom, n=2), di(2-pentynyl)carbonate ($R^1=R^4$=ethyl group, $R^2=R^3$=hydrogen atom, n=1), di(1-methyl-2-butynyl)carbonate ($R^1=R^4$=methyl group, $R^2=R^3$=methyl group, n=1), 2-propynyl-2'-butynyl carbonate ($R^1=R^2=R^3$=hydrogen atom, $R^4$=methyl group, n=1), etc. However, the present invention is not limited to these compounds in any way.

In the alkyne carbonate derivatives, if the content of the alkyne carbonate derivative having the formula (IV) is too large, the conductivity of the electrolyte etc. change and the battery performance is decreased in some cases. Further, if too small, a sufficient coating is not formed and the expected battery performance is not obtained. Therefore, the content is preferably in the range of 0.01 to 20% by weight, particularly 0.1 to 10% by weight, based upon the weight of the electrolyte.

The non-aqueous solvent used in the present invention preferably comprises a mixture of a high dielectric solvent and a low viscosity solvent.

Examples of the high dielectric solvent are preferably a cyclic carbonate such as ethylene carbonate (EC), propylene carbonate (PC), and butylene carbonate (BC). These high dielectric solvents may be used alone or in any combination thereof.

Examples of the low viscosity solvent are a linear carbonate such as dimethyl carbonate (DMC), methylethyl carbonate (MEC), and diethyl carbonate (DEC), methylpropyl carbonate (MPC), butylmethyl carbonate (BMC), methylisopropyl carbonate (MIPC), isobutylmethyl carbonate (IBMC), sec-butylmethyl carbonate (SBMC) and tert-butylmethyl carbonate (TBMC), an ether such as tetrahydrofuran, 2-methyltetrahydrofuran, 1,4-dioxane, 1,2-dimethoxyethane, 1,2-diethoxyethane, and 1,2-dibutoxyethane, a lactone such as γ-butyrolactone, γ-valerolactone, a nitrile such as acetonitrile, an ester such as methyl propionate, and an amide such as dimethyl formamide. These low viscosity solvents may be used alone or in any combination thereof.

The high dielectric solvent and low viscosity solvent are freely selected and combined for use. Note that the high dielectric solvent and low viscosity solvent are usually used in a ratio by volume (high dielectric solvent:low viscosity solvent) of 1:9 to 4:1, preferably 1:4 to 7:3.

Examples of the electrolyte salt used in the present invention are $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3$ $(CF_3)_3$, $LiPF_4$ (iso-$C_3F_7)_2$, $LiPF_5$(iso-$C_3F_7$), etc. These salts may be used alone or in any combination thereof. These salts are normally dissolved in the non-aqueous solvent in a concentration of 0.1 to 3M, preferably 0.5 to 1.5M.

The non-aqueous electrolyte of the present invention can be obtained by, for example, mixing the high dielectric solvent or low viscosity solvent, dissolving the electrolyte salt therein, and dissolving at least one alkyne derivative having the formulae (I), (II) and (III), or at least one alkyne carbonate derivative having the formula (IV).

The electrolytes of the present invention can be used as a component member of a secondary battery, in particularly as a component member of a lithium secondary battery. The other component members of the secondary battery are not particularly limited. The various component members conventionally used in the past may be used.

For example, as the cathode active material, a complex metal oxide of at least one metal selected from the group consisting of cobalt, manganese, nickel, chrome, iron, and vanadium with lithium is used. Examples of such a complex metal oxide are $LiCoO_2$, $LiMn_2O_4$, $LiNiO_2$, etc.

The cathode is prepared by mixing the cathode active material with a conductive agent such as acetylene black or carbon black and a binder such as polytetrafluoroethylene (PTFE) and polyvinylidene fluoride (PVDF) to make a cathode paste, then rolling this cathode paste on a collector such as aluminum foil or a stainless steel foil or lathe, then heat treating at a temperature of 50 to 250° C. for about 2 hours in vacuum.

As the anode (or anode active material), lithium metal or a lithium alloy and a carbonaceous material (heat cracked carbons, coke, artificial graphite, natural graphite, an organic polymer compound sintered product, carbon fiber) having a graphite-type crystal structure able to absorb and discharge lithium, a complex tin oxide, etc. may be used. In particular, a carbonaceous material having a graphite-type crystal structure having a lattice spacing ($d_{002}$) of the lattice face (002) of 0.335 to 0.340 nm (i.e., nanometer) is preferably used. Note that the powder material such as the carbonaceous material is mixed with a binder such as ethylene propylene diene terpolymer (EPDM), polytetrafluoroethylene (PTFE), or polyvinylidene fluoride (PVDF) to make an anode paste.

The structure of the lithium secondary battery is not particularly limited. A coin battery having a cathode, anode, single layer or multiple layer separator and further, a cylindrical battery, prismatic battery, etc. having a cathode, anode, and roll-shaped separator may be mentioned as examples. Note that as the separator, a known polyolefin porous film, woven fabric, nonwoven fabric, etc. is used.

EXAMPLES

The present invention will now be further explained in detail by, but is by no means limited to, the following Examples and Comparative Examples.

Example I-1

Preparation of Electrolyte

A non-aqueous solvent of PC/DMC (1/2 volume ratio) was prepared, $LiPF_6$ was dissolved therein to a concentration of 1M to prepare the electrolyte, then 2-propynylmethyl carbonate, as the alkyne derivative, was added thereto, to a concentration of 1.0% by weight, based upon the weight of the electrolyte.

Manufacture of Lithium Secondary Battery and Measurement of Battery Characteristics 80% by weight of $LiCoO_2$ (i.e., cathode active material), 10% by weight of acetylene black (i.e., conductive agent), and 10% by weight of polyvinylidene fluoride (i.e., binder) were mixed. 1-methyl-2-pyrrolidone was added thereto to form a slurry which was then coated on an aluminum foil. Next, this was dried and compression molded to form the cathode. 90% by weight of natural graphite (i.e., anode active material) and 10% by weight of polyvinylidene fluoride (i.e., binder) were mixed. 1-methyl-2-pyrrolidone was added thereto to form a slurry which was then coated on a copper foil. Next, this was dried and compression molded to form the anode. A separator of a polypropylene porous film was used and the above electrolyte was injected to prepare a coin battery having a diameter of 20 mm and a thickness of 3.2 mm.

This coin type battery was charged at room temperature (i.e., 20° C.) by a 0.8 mA constant current and constant voltage for 5 hours to an end voltage of 4.2V, then was discharged under a constant current of 0.8 mA to an end voltage of 2.7V. This charging and discharging was repeated. The initial discharge capacity, calculated as a relative capacity compared with the case of use of 1M $LiPF_6$-EC/DMC (1/2 volume ratio) as the electrolyte (Comparative Example I-2), was 0.95. The battery characteristics after 50 cycles were measured, whereupon the retaining rate of the discharging capacity when the initial discharge capacity was 100%, was 87.8%. Further, the low temperature characteristics were also good. The manufacturing conditions of a coin battery and the battery characteristics of the same are shown in Table I-1.

Example I-2

The same procedure was followed as in Example I-1 except for using, as the alkyne derivative, 2-propynyl acetate in an amount of 1.0% by weight, based upon the weight of the electrolyte, to prepare the electrolyte and prepare a coin battery. The relative capacity of the initial discharge capacity was 0.95. The battery characteristics were measured after 50 cycles, whereupon the retaining rate of the discharge capacity was 86.4%. The manufacturing conditions of the coin battery and the battery characteristics are shown in Table I-1.

Example I-3

The same procedure was followed as in Example I-1, except for using, as the alkyne derivative, 2-propynyl methanesulfonate in an amount of 1.0% by weight, based upon the weight of the electrolyte, to prepare the electrolyte and prepare a coin battery. The relative capacity of the initial discharge capacity was 0.95. The battery characteristics were measured after 50 cycles, whereupon the retaining rate of the discharge capacity was 88.6%. The manufacturing conditions of the coin battery and the battery characteristics are shown in Table I-1.

Example I-4

The same procedure was followed as in Example I-1, except for using, as the alkyne derivative, 2-butyne-1,4-diol dimethyldicarbonate in an amount of 1.0% by weight, based upon the weight of the electrolyte, to prepare the electrolyte and prepare a coin battery. The relative capacity of the initial discharge capacity was 0.97. The battery characteristics were measured after 50 cycles, whereupon the retaining rate of the discharge capacity was 89.3%. The manufacturing conditions of the coin battery and the battery characteristics are shown in Table I-1.

Example I-5

The same procedure was followed as in Example I-1, except for using, as the alkyne derivative, 2-butyne-1,4-diol dimethanesulfonate in an amount of 1.0% by weight, based upon the weight of the electrolyte, to prepare the electrolyte and prepare a coin battery. The relative capacity of the initial discharge capacity was 0.97. The battery characteristics were measured after 50 cycles, whereupon the retaining rate of the discharge capacity was 89.5%. The manufacturing conditions of the coin battery and the battery characteristics are shown in Table I-1.

Comparative Example I-1

A non-aqueous solvent of PC/DMC (1/2 volume ratio) was prepared, and $LiPF_6$ was dissolved therein to a concentration of 1M. At this time, no alkyne derivative was added at all. This non-aqueous electrolyte was used to prepare a coin battery and measure the battery characteristics in the same way as in Example I-1. The PC decomposed at the initial charging and no discharge at all was possible. The battery was disassembled after the initial charging and examined, whereupon peeling of the graphite anode was observed. The manufacturing conditions of the coin battery and the battery characteristics are shown in Table I-1.

Example I-6

Instead of PC, EC was used to prepare a non-aqueous solvent of EC/DMC (1/2 volume ratio). $LiPF_6$ was dissolved therein to a concentration of 1M to prepare the electrolyte, then phenyl acetylene was added as the alkyne derivative to 0.2% by weight, based upon the weight of the electrolyte. The same procedure was followed as in Example I-1 using this electrolyte to prepare a coin battery and measure the battery characteristics, whereupon the initial discharge capacity, calculated as the relative capacity compared with the case of use of EC/DMC (1/2 volume ratio) as the electrolyte (Comparative Example I-2), was 1.04. The battery characteristics after 50 cycles were measured, whereupon the retaining rate of the discharge capacity, when the initial discharge capacity was 100%, was 92.2%. The manufacturing conditions of the coin battery and the battery characteristics are shown in Table I-1.

Example I-7

The same procedure was followed as in Example I-6, except for using, as the alkyne derivative, 1-phenyl-1-propyne in an amount of 0.2% by weight, based upon the weight of the electrolyte and using MEC instead of DMC, to prepare the electrolyte and prepare a coin battery. The relative capacity of the initial discharge capacity was 1.03. The battery characteristics were measured after 50 cycles, whereupon the retaining rate of the discharge capacity was 91.7%. Further, the low temperature characteristics were also excellent. The manufacturing conditions of the coin battery and the battery characteristics are shown in Table I-1.

Example I-8

The same procedure was followed as in Example I-1, except for using, as the alkyne derivative, 2-butyne-1,4-diol dimethanesulfonate in an amount of 1.0% by weight, based upon the weight of the electrolyte and using a non-aqueous solvent of PC/EC/MEC (1/1/2 volume ratio), to prepare a coin battery. The relative capacity of the initial discharge capacity was 1.01. The battery characteristics were measured after 50 cycles, whereupon the retaining rate of the discharge capacity was 92.6%. Further, the low temperature characteristics were also excellent. The manufacturing conditions of the coin battery and the battery characteristics are shown in Table I-1.

Example I-9

The same procedure was followed as in Example I-8, except for using, as the alkyne derivative, 2-propynyl methanesulfonate in an amount of 1.0% by weight, based upon the weight of the electrolyte, to prepare a coin battery. The relative capacity of the initial discharge capacity was 1.01. The battery characteristics were measured after 50 cycles, whereupon the retaining rate of the discharge capacity was 92.1%. Further, the low temperature characteristics were also excellent. The manufacturing conditions of the coin battery and the battery characteristics are shown in Table I-1.

Example I-10

The same procedure was followed as in Example I-8, except for using, as the alkyne derivative, 2-propynylmethyl carbonate in an amount of 1.0% by weight, based upon the weight of the electrolyte, to prepare a coin battery. The relative capacity of the initial discharge capacity was 1.01. The battery characteristics were measured after 50 cycles, whereupon the retaining rate of the discharge capacity was 91.8%. Further, the low temperature characteristics were also excellent. The manufacturing conditions of the coin battery and the battery characteristics are shown in Table I-1.

Example I-11

The same procedure was followed as in Example I-6, except for using, as the cathode active material, $LiMn_2O_4$ instead of $LiCoO_2$ and using, as the alkyne derivative, phenylacetylene in an amount of 0.2% by weight, based upon the weight of the electrolyte, to prepare an electrolyte and prepare a coin battery. The relative capacity of the initial discharge capacity was 0.80. The battery characteristics were measured after 50 cycles, whereupon the retaining rate of the discharge capacity was 93.8%. The manufacturing conditions of the coin battery and the battery characteristics are shown in Table I-1.

Example I-12

The same procedure was followed as in Example I-6, except for using, as the cathode active material, $LiCo_{0.1}Ni_{0.9}O_2$ instead of $LiCoO_2$, to prepare an electrolyte and prepare a coin battery. The relative capacity of the initial discharge capacity was 1.18. The battery characteristics were measured after 50 cycles, whereupon the retaining rate of the discharge capacity was 90.8%. The manufacturing conditions of the coin battery and the battery characteristics are shown in Table I-1.

Example I-13

The same procedure was followed as in Example I-7, except for using, as the anode active material, artificial graphite instead of natural graphite, to prepare an electrolyte and prepare a coin battery. The relative capacity of the initial discharge capacity was 1.05. The battery characteristics were measured after 50 cycles, whereupon the retaining rate of the discharge capacity was 91.2%. The manufacturing conditions of the coin battery and the battery characteristics are shown in Table I-1.

Comparative Example I-2

A non-aqueous solvent of EC/DMC (1/2 volume ratio) was prepared. $LiPF_6$ was dissolved in this to a concentration of 1M. At this time, no alkyne derivative at all was added. This electrolyte was used to prepare a coin battery and measure the battery characteristics in the same way as in Example I-1. The relative capacity of the initial discharge capacity in this case was 1. The retaining rate of the discharge capacity after 50 cycles was 83.8%, based upon the initial discharge capacity. The manufacturing conditions of the coin battery and the battery characteristics are shown in Table I-1.

TABLE I-1

| | Cathode | Anode | Compound | Am't added (wt %) | Electrolyte composition (vol. ratio) | Initial discharge capacity (relative value) | 50 cycle discharge capacity retaining rate (%) |
|---|---|---|---|---|---|---|---|
| Ex. I-1 | $LiCoO_2$ | Natural graphite | 2-propynylmethyl carbonate | 1.0 | 1M $LiPF_6$, PC/DMC = 1/2 | 0.95 | 87.8 |
| Ex. I-2 | $LiCoO_2$ | Natural graphite | 2-propynyl acetate | 1.0 | 1M $LiPF_6$, PC/DMC = 1/2 | 0.95 | 86.4 |
| Ex. I-3 | $LiCoO_2$ | Natural graphite | 2-propynyl methanesulfonate | 1.0 | 1M $LiPF_6$, PC/DMC = 1/2 | 0.95 | 88.6 |
| Ex. I-4 | $LiCoO_2$ | Natural graphite | 2-butyne-1,4-diol dimethyldicarbonate | 1.0 | 1M $LiPF_6$, PC/DMC = 1/2 | 0.97 | 89.3 |
| Ex. I-5 | $LiCoO_2$ | Natural graphite | 2-butyne-1,4-diol dimethanesulfonate | 1.0 | 1M $LiPF_6$, PC/DMC = 1/2 | 0.97 | 89.5 |
| Comp. Ex. I-1 | $LiCoO_2$ | Natural graphite | None | 0.0 | 1M $LiPF_6$, PC/DMC = 1/2 | 0 | — |
| Ex. I-6 | $LiCoO_2$ | Natural graphite | Phenylacetylene | 0.2 | 1M $LiPF_6$, EC/DMC = 1/2 | 1.04 | 92.2 |
| Ex. I-7 | $LiCoO_2$ | Natural graphite | 1-phenyl-1-propyne | 0.2 | 1M $LiPF_6$, EC/MEC = 1/2 | 1.03 | 91.7 |
| Ex. I-8 | $LiCoO_2$ | Natural graphite | 2-butyne-1,4-diol dimethanesulfonate | 1.0 | 1M $LiPF_6$, EC/PC/MEC = 1/1/2 | 1.01 | 92.6 |
| Ex. I-9 | $LiCoO_2$ | Natural graphite | 2-propynyl methanesulfonate | 1.0 | 1M $LiPF_6$, EC/PC/MEC = 1/1/2 | 1.01 | 92.1 |
| Ex. I-10 | $LiCoO_2$ | Natural graphite | 2-propynyl methylcarbonate | 1.0 | 1M $LiPF_6$, EC/PC/MEC = 1/1/2 | 1.01 | 91.8 |
| Ex. I-11 | $LiMn_2O_4$ | Natural graphite | Phenylacetylene | 0.2 | 1M $LiPF_6$, EC/DMC = 1/2 | 0.80 | 93.8 |
| Ex. I-12 | $LiCo_{0.1}Ni_{0.9}O_2$ | Natural graphite | Phenylacetylene | 0.2 | 1M $LiPF_6$, EC/DMC = 1/2 | 1.18 | 90.8 |
| Ex. I-13 | $LiCoO_2$ | Artificial graphite | 1-phenyl-1-propyne | 0.2 | 1M $LiPF_6$, EC/MEC = 1/2 | 1.05 | 91.2 |
| Comp. Ex. I-2 | $LiCoO_2$ | Natural graphite | None | 0.0 | 1M $LiPF_6$, EC/DMC = 1/2 | 1 | 83.8 |

Example II-1

Preparation of Electrolyte

A non-aqueous solvent of PC/DMC (1/2 volume ratio) was prepared, $LiPF_6$ was dissolved therein to a concentration of 1M to prepare the electrolyte, then dipropargyl carbonate was added to 2% by weight, based upon the weight of the electrolyte as the alkyne carbonate derivative.

Manufacture of Lithium Secondary Battery and Measurement of Battery Characteristics 80% by weight of $LiCoO_2$ (i.e., cathode active material), 10% by weight of acetylene black (i.e., conductive agent), and 10% by weight of polyvinylidene fluoride (binder) were mixed. 1-methyl-2-pyrrolidone was added thereto to form a slurry which was then coated on an aluminum foil. Next, this was dried and compression molded to form the cathode. 90% by weight of natural graphite (i.e., anode active material) and 10% by weight of polyvinylidene fluoride (i.e., binder) were mixed. 1-methyl-2-pyrrolidone was added thereto to form a slurry which was then coated on a copper foil. Next, this was dried and compression molded to form the anode. A separator of a polypropylene porous film was used and the above electrolyte was injected to prepare a coin battery having a diameter of 20 mm and a thickness of 3.2 mm.

This coin type battery was charged at room temperature (i.e.,20° C.) by a 0.8 mA constant current and constant voltage for 5 hours to an end voltage of 4.2V, then was discharged under a constant current of 0.8 mA to an end voltage of 2.7V. This charging and discharging was repeated. The initial discharge capacity, calculated as a relative capacity compared with the case of use of 1M $LiPF_6$-EC/DMC (1/2 volume ratio) as the electrolyte (Comparative Example II-2), was 0.97. The battery characteristics after 50 cycles were measured, whereupon the retaining rate of the discharge capacity, when the initial discharge capacity was 100%, was 89.8%. Further, the low temperature characteristics were also good. The manufacturing conditions of coin batteries and the battery characteristics of the same are shown in Table II-1.

Comparative Example II-1

A non-aqueous solvent of PC/DMC=1/2 (volume ratio) was prepared, and $LiPF_6$ was dissolved therein to a concentration of 1M. At this time, no alkyne carbonate derivative was added at all. This non-aqueous electrolyte was used to prepare a coin battery and measure the battery characteristics in the same way as in Example II-1. The PC decomposed at the initial charging and no discharge was possible at all. The battery was disassembled after the initial charging and examined, whereupon peeling of the graphite anode was observed. The manufacturing conditions of the coin battery and the battery characteristics are shown in Table II-1.

Example II-2

Instead of PC/DMC, EC/DEC was used to prepare a non-aqueous solvent of EC/DEC=1/2 (volume ratio). $LiPF_6$ was dissolved therein to a concentration of 1M to prepare the electrolyte, then dipropargyl carbonate was added as the alkyne carbonate derivative to 1% by weight, based upon the weight of the electrolyte. Using this electrolyte, the same procedure was followed as in Example II-1 to prepare a coin battery and measure the battery characteristics, whereupon it was found that the initial discharge capacity, calculated as the relative capacity compared with the case of use of 1M $LiPF_6$-EC/DEC (1/2 volume ratio) as the electrolyte (i.e., Comparative Example II-2), was 1.05. The battery characteristics after 50 cycles were measured, whereupon the retaining rate of the discharge capacity, when the initial discharge capacity was 100%, was 92.5%. The manufacturing conditions of the coin battery and the battery characteristics are shown in Table II-1.

Example II-3

The same procedure was followed as in Example II-2, except for using, as the alkyne carbonate derivative, dipropargyl carbonate in an amount of 0.5% by weight, based upon the weight of the electrolyte, to prepare the electrolyte and prepare a coin battery. The relative capacity of the initial discharge capacity was 1.02. The battery characteristics were measured after 50 cycles, whereupon the retaining rate of the discharge capacity was 90.9%. Further, the low temperature characteristics were also excellent. The manufacturing conditions of the coin battery and the battery characteristics are shown in Table II-1.

Example II-4

The same procedure was followed as in Example II-1, except for using, as the alkyne carbonate derivative, dipropargyl carbonate in an amount of 3% by weight, based upon the weight of the electrolyte and using a non-aqueous solvent of PC/EC/DEC (1/2/7 volume ratio), to prepare a coin battery. The relative capacity of the initial discharge capacity was 1.04. The battery characteristics were measured after 50 cycles, whereupon the retaining rate of the discharge capacity was 92.8%. Further, the low temperature characteristics were also excellent. The manufacturing conditions of the coin battery and the battery characteristics are shown in Table II-1.

Example II-5

The same procedure was followed as in Example II-1, except for using, as the alkyne carbonate derivative, dipropargyl carbonate in an amount of 7% by weight, based upon the weight of the electrolyte and using a non-aqueous solvent of PC/EC/MEC (1/2/7 volume ratio), to prepare a coin battery. The relative capacity of the initial discharge capacity was 1.01. The battery characteristics were measured after 50 cycles, whereupon the retaining rate of the discharge capacity was 91.8%. Further, the low temperature characteristics were also excellent. The manufacturing conditions of the coin battery and the battery characteristics are shown in Table II-1.

Example II-6

The same procedure was followed as in Example II-4, except for using, as the cathode active material, $LiMn_2O_4$ instead of $LiCoO_2$ and using, as the alkyne carbonate derivative, dipropargyl carbonate in an amount of 2% by weight, based upon the weight of the electrolyte, to prepare an electrolyte and prepare a coin battery. The relative capacity of the initial discharge capacity was 0.83. The battery characteristics were measured after 50 cycles, whereupon the retaining rate of the discharge capacity was 93.6%. The manufacturing conditions of the coin battery and the battery characteristics are shown in Table II-1.

Example II-7

The same procedure was followed as in Example II-6, except for using, as the cathode active material, $LiCo_{0.1}Ni_{0.9}O_2$ instead of $LiMn_2O_4$, to prepare an electrolyte and prepare a coin battery. The relative capacity of the initial discharge capacity was 1.19. The battery characteristics were measured after 50 cycles, whereupon the retaining rate of the discharge capacity was 90.4%. The manufacturing conditions of the coin battery and the battery characteristics are shown in Table II-1.

Example II-8

The same procedure was followed as in Example II-4, except for using, as the anode active material, artificial graphite instead of natural graphite, to prepare an electrolyte and prepare a coin battery. The relative capacity of the initial discharge capacity was 1.05. The battery characteristics were measured after 50 cycles, whereupon the retaining rate of the discharge capacity was 93.2%. The manufacturing conditions of the coin battery and the battery characteristics are shown in Table II-1.

Comparative Example II-2

A non-aqueous solvent of EC/DEC (1/2 volume ratio) was prepared. $LIPF_6$ was dissolved in this to a concentration of 1M. At this time, no alkyne carbonate derivative was added at all. This electrolyte was used to prepare a coin battery and measure the battery characteristics in the same way as in Example II-1. The relative capacity of the initial discharge capacity in this case was 1. The retaining rate of the discharge capacity after 50 cycles was 82.8%, based upon the weight of the initial discharge capacity. The manufacturing conditions of the coin battery and the battery characteristics are shown in Table II-1.

TABLE II-1

|  | Cathode | Anode | Compound | Am't added (wt %) | Electrolyte composition (vol. ratio) | Initial discharge capacity (relative value) | 50 cycle discharge capacity retaining rate (%) |
|---|---|---|---|---|---|---|---|
| Ex. II-1 | $LiCoO_2$ | Natural graphite | Dipropargyl carbonate | 2 | 1M $LiPF_6$, PC/DMC = 1/2 | 0.97 | 89.8 |
| Comp. Ex. II-1 | $LiCoO_2$ | Natural graphite | None | 0 | 1M $LiPF_6$, PC/DMC = 1/2 | 0 | — |
| Ex. II-2 | $LiCoO_2$ | Natural graphite | Dipropargyl carbonate | 1 | 1M $LiPF_6$, EC/DEC = 1/2 | 1.05 | 92.5 |
| Ex. II-3 | $LiCoO_2$ | Natural graphite | Dipropargyl carbonate | 0.5 | 1M $LiPF_6$, EC/DEC = 1/2 | 1.02 | 90.9 |
| Ex. II-4 | $LiCoO_2$ | Natural graphite | Dipropargyl carbonate | 3 | 1M $LiPF_6$, PC/EC/DEC = 1/2/7 | 1.04 | 92.8 |
| Ex. II-5 | $LiCoO_2$ | Natural graphite | Dipropargyl carbonate | 7 | 1M $LiPF_6$, PC/EC/MEC = 1/2/7 | 1.01 | 91.8 |
| Ex. II-6 | $LiMn_2O_4$ | Natural graphite | Dipropargyl carbonate | 2 | 1M $LiPF_6$, PC/EC/DEC = 1/2/7 | 0.83 | 93.6 |

TABLE II-1-continued

| | Cathode | Anode | Compound | Am't added (wt %) | Electrolyte composition (vol. ratio) | Initial discharge capacity (relative value) | 50 cycle discharge capacity retaining rate (%) |
|---|---|---|---|---|---|---|---|
| Ex. II-7 | $LiCo_{0.1}Ni_{0.9}O_2$ | Natural graphite | Dipropargyl carbonate | 2 | 1M $LiPF_6$, PC/EC/DEC = 1/2/7 | 1.19 | 90.4 |
| Ex. II-8 | $LiCoO_2$ | Artificial graphite | Dipropargyl carbonate | 3 | 1M $LiPF_6$, PC/EC/DEC = 1/2/7 | 1.05 | 93.2 |
| Comp. Ex. II-2 | $LiCoO_2$ | Natural graphite | None | 0 | 1M $LiPF_6$, EC/DEC = 1/2 | 1 | 82.8 |

Note that the present invention is not limited to the above-described Examples. Various combinations easily deducible from the gist of the invention are also possible. In particular, the combinations of solvents in the Examples are not limitative. Further, the above Examples related to coin batteries, but the present invention may also be applied to cylindrical batteries and prismatic batteries.

According to the present invention, it is possible to provide a lithium secondary battery superior in the battery cycle characteristics and battery characteristics such as the electrical capacity and storage characteristics over a wide temperature range.

What is claimed is:

1. An electrolyte for a lithium secondary battery comprising (i) a non-aqueous solvent, (ii) an electrolyte salt dissolved therein and (iii) (a) at least one alkyne derivative having the formulae (I), (II), and (III) or (b) at least one alkyne carbonate derivative having the formula (IV):

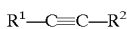
(I)

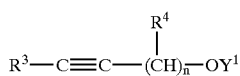
(II)

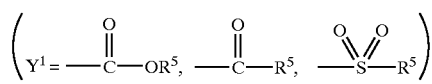

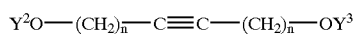
(III)

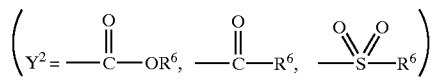

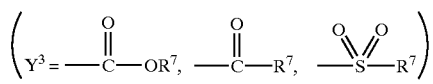

(IV)
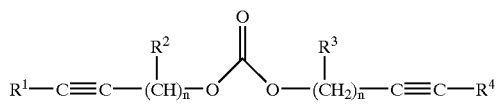

wherein $R^1$, $R^2$, $R^3$, and $R^4$ independently indicate a member selected from the group consisting of a $C_1$ to $C_{12}$ alkyl group, a $C_3$ to $C_6$ cycloalkyl group, an aryl group, and a hydrogen atom; and wherein $R^5$, $R^6$, and $R^7$ in $Y^1$, $Y^2$, and $Y^3$ independently indicate a member selected from the group consisting of a $C_1$ to $C_{12}$ alkyl group, a $C_3$ to $C_6$ cycloalkyl group, and an aryl group; and further wherein n is an integer selected from the group consisting of 1 and 2.

2. The electrolyte as claimed in claim 1, wherein the non-aqueous solvent comprises a mixture of a high dielectric solvent and a low viscosity solvent in a volume ratio of 1:9 to 4:1.

3. The electrolyte as claimed in claim 2, wherein the high dielectric solvent comprises at least one cyclic carbonate selected from the group consisting of ethylene carbonate (EC), propylene carbonate (PC) and butylene carbonate (BC).

4. The electrolyte as claimed in claim 2, wherein the low viscosity solvent comprises at least one solvent selected from the group consisting of dimethyl carbonate (DMC), methylethyl carbonate (MEC), diethyl carbonate (DEC), methylpropyl carbonate (MPC), butylmethyl carbonate (BMC), methylisopropyl carbonate (MIPC), isobutylmethyl carbonate (IBMC), sec-butylmethyl carbonate (SBMC) and tert-butylmethyl carbonate (TBMC), tetrahydrofuran, 2-methyl tetrahydrofuran, 1,4-dioxane, 1,2-dimethoxyethane, 1,2-diethoxyethane, 1,2-dibutoxyethane γ-butyrolactone, γ-valerolactone, acetonitrile, methyl propionate, and dimethyl formamide.

5. The electrolyte as claimed in claim 1, wherein the electrolyte salt comprises at least one compound selected from the group consisting of $LiPF_6$, $LiBF_4$, $LiClO_4$, $LiN(SO_2CF_3)_2$, $LiN(SO_2C_2F_5)_2$, $LiC(SO_2CF_3)_3$, $LiPF_3(CF_3)_3$, $LiPF_3(C_2F_5)_3$, $LiPF_4(C_2F_5)_2$, $LiPF_5(iso-C_3F_7)$, and $LiPF_4(iso-C_3F_7)_2$.

6. The electrolyte as claimed in claim 5, wherein the concentration of the electrolyte salt in the non-aqueous solvent is 0.1 to 3M.

7. The electrolyte as claimed in claim 1, wherein said alkyne derivative comprises at least one compound having the formulae (I), (II), and (II), wherein $R^1$, $R^2$, $R^3$, and $R^4$ in the formulae (I), (II), and (III) are independently a member selected from the group consisting of a methyl group, an ethyl group, a propyl group, a butyl group, a pentyl group, a hexyl group, an octyl group, a decyl group, an isopropyl group, an isobutyl group, a cyclopropyl group, a cyclohexyl group, a phenyl group, a benzyl group, a p-tolyl group, and a hydrogen atom; and further wherein $R^5$, $R^6$, and $R^7$ in $Y^1$, $Y^2$, and $Y^3$ in the formulae (II) and (III) are independently a member selected from the group consisting of a methyl group, an ethyl group, a propyl group, a butyl group, a pentyl group, a hexyl group, an isopropyl group, an isobutyl group, a cyclopropyl group, a cyclohexyl group, a phenyl group, a benzyl group, and a p-tolyl group; and further wherein n is an integer selected from the group consisting of 1 and 2.

8. The electrolyte as claimed in claim 1, wherein said alkyne derivative is at least one compound having the formula (I) selected from the group consisting of 2-pentyne, 1-hexyne, 2-hexyne, 3-hexyne, 1-heptyne, 1-octyne, 2-octyne, 4-octyne, 1-decyne, 1-dodecyne, phenylacetylene, 1-phenyl-1-propyne, 1-phenyl-1-butyne, 1-phenyl-1-pentyne, 1-phenyl-1-hexyne, diphenylacetylene, 4-ethynyltoluene and dicyclohexylacetylene.

9. The electrolyte as claimed in claim 1, wherein said alkyne derivative is at least one compound having the formula (II) selected from the group consisting of (a) when $Y^1$=—$COOR^5$, 2-propynylmethyl carbonate, 2-propynylethyl carbonate, 2-propynylpropyl carbonate, 2-propynylbutyl carbonate, 2-propynylphenyl carbonate, 2-propynylcyclohexyl carbonate, 2-butynylmethyl carbonate, 3-butynylmethyl carbonate, 2-pentynylmethyl carbonate and 1-methyl-2-butynylmethyl carbonate; (b) when $Y^1$=—$COR^5$, 2-propynyl acetate, 2-propynyl propionate, 2-propynyl butyrate, 2-propynyl benzoate, 2-propynylcyclohexyl carbonate, 2-butynyl acetate, 3-butynyl acetate, 2-pentynyl acetate and 1-methyl-2-butynyl acetate; and (c) when $Y^1$=—$SO_2R^5$, 2-propynyl methanesulfonate, 2-propynyl ethanesulfonate, 2-propynyl propanesulfonate, 2-propynyl p-toluenesulfonate, 2-propynyl cyclohexylsulfonate, 2-butynyl methanesulfonate, 3-butynyl methanesulfonate, 2-pentynyl methanesulfonate and 1-methyl-2-butynyl methanesulfonate.

10. The electrolyte as claimed in claim 1, wherein said alkyne derivative is at least one compound having the formula (III) selected from the group consisting of (a) when $Y^2$=—$COOR^6$ and/or $Y^3$=—$COOR^7$, 2-butyne-1,4-diol dimethyldicarbonate, 2-butyne-1,4-diol diethyldicarbonate, 2-butyne-1,4-diol diphenyldicarbonate and 2-butyne-1,4-diol dicyclohexyldicarbonate; (b) when $Y^2$=—$COR^6$ and/or $Y^3$=—$COR^7$, 2-butyne-1,4-diol diacetate, 2-butyne-1,4-diol dipropionate, 2-butyne-1,4-diol dibenzoate and 2-butyne-1,4-diol dicyclohexanecarboxylate; and (c) when $Y^2$—$SO_2R^6$ and/or $Y^3$=—$SO_2R^7$, 2-butyne-1,4-diol dimethanesulfonate, 2-butyne-1,4-diol dipropanesulfonate, 2-butyne-1,4-diol di-p-toluenesulfonate and 2-butyne-1,4-diol dicyclohexanesulfonate.

11. The electrolyte as claimed in claim 1, wherein said alkyne carbonate derivative is at least one compound having the formula (IV), wherein $R^1$, $R^2$, $R^3$, and $R^4$ in the alkyne carbonate derivative (IV) are independently a member selected from the group consisting of a methyl group, an ethyl group, a propyl group, a butyl group, a pentyl group, a hexyl group, an isopropyl group, an isobutyl group, a cyclopropyl group, a cyclohexyl group, a phenyl group, a benzyl group, a p-tolyl group, and a hydrogen atom; and further wherein n is an integer selected from the group consisting of 1 and 2.

12. The electrolyte as claimed in claim 1, wherein said alkyne carbonate derivative is at least one compound having the formula (IV) selected from the group consisting of dipropargyl carbonate, di(2-butynyl)carbonate, di(3-butynyl)carbonate, di(2-pentynyl)carbonate, di(1-methyl-2-butynyl)carbonate and 2-propynyl-2'-butynyl carbonate.

13. A lithium secondary battery comprising (a) a cathode, (b) an anode, and (c) an electrolyte comprising (i) a non-aqueous solvent, (ii) an electrolyte salt dissolved therein and (iii) at least one alkyne derivative having the formulae (I), (II), and (III), or at least one alkyne carbonate derivative having the formula (IV):

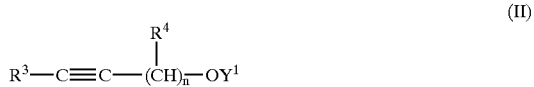

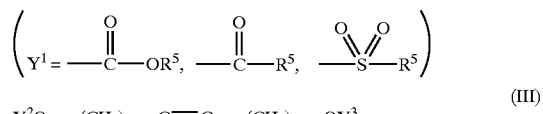

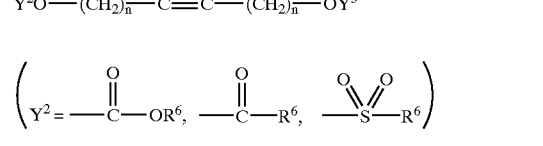

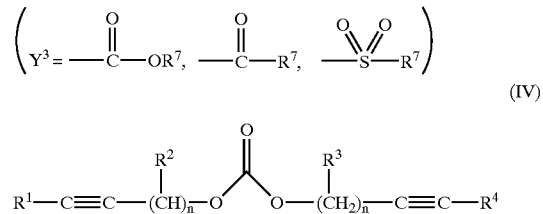

wherein $R^1$, $R^2$, $R^3$, and $R^4$ independently indicate a member selected from the group consisting of a $C_1$ to $C_{12}$ alkyl group, a $C_3$ to $C_6$ cycloalkyl group, an aryl group, and a hydrogen atom; and further wherein $R^5$, $R^6$, and $R^7$ in $Y^1$, $Y^2$, and $Y^3$ independently indicate a member selected from the group consisting of a $C_1$ to $C_{12}$ alkyl group, a $C_3$ to $C_6$ cycloalkyl group, and an aryl group; and further wherein n is an integer selected from the group consisting of 1 and 2.

14. The lithium battery as claimed in claim 13, wherein the non-aqueous solvent comprises a mixture of a high dielectric solvent and a low viscosity solvent in a volume ratio of 1:9 to 4:1.

15. The lithium secondary battery as claimed in claim 13, wherein the high dielectric solvent comprises at least one cyclic carbonate selected from the group consisting of ethylene carbonate (EC), propylene carbonate (PC) and butylene carbonate (BC).

16. The lithium secondary battery as claimed in claim 13, wherein the low viscosity solvent comprises at least one solvent selected from the group consisting of dimethyl carbonate (DMC), methylethyl carbonate (MEC), diethyl carbonate (DEC), methylpropyl carbonate (MPC), butylmethyl carbonate (BMC), methylisopropyl carbonate (MIPC), isobutylmethyl carbonate (IBMC), sec-butylmethyl carbonate (SBMC) and tert-butylmethyl carbonate (TBMC), tetrahydrofuran, 2-methyl tetrahydrofuran, 1,4-dioxane, 1,2-dimethoxyethane, 1,2-diethoxyethane, 1,2-dibutoxyethane γ-butyrolactone, γ-valerolactone, acetonitrile, methyl propionate, and dimethyl formamide.

17. The lithium secondary battery as claimed in claim 13, wherein the electrolyte salt comprises at least one compound selected from the group consisting of $LiPF_6$, $LiBF_4$, $LiClO_4$, $LiN(SO_2CF_3)_2$, $LiN(SO_2C_2F_5)_2$, $LiC(SO_2CF_3)_3$, $LiPF_3(CF_3)_3$, $LiPF_3(C_2F_5)_3$, $LiPF_4(C_2F_5)_2$, $LiPF_5(iso-C_3F_7)$, and $LiPF_4(iso-C_3F_7)_2$.

18. The lithium secondary battery as claimed in claim 13, wherein said anode comprises a carbonaceous material having a graphite-type crystal structure having a lattice spacing ($d_{002}$) of the lattice face (002) of 0.335 to 0.340 nm.

19. The lithium battery as claimed in claim 13, wherein said alkyne derivative comprises at least one compound having the formulae (I), (II), and (III), wherein $R^1$, $R^2$, $R^3$, and $R^4$ in the formulae (I), (II), and (III) are independently a member selected from the group consisting of a methyl group, an ethyl group, a propyl group, a butyl group, a pentyl group, a hexyl group, an octyl group, a decyl group, an isopropyl group, an isobutyl group, a cyclopropyl group, a cyclohexyl group, a phenyl group, a benzyl group, a p-tolyl group, and a hydrogen atom; and further wherein $R^5$, $R^6$, and $R^7$ in $Y^1$, $Y^2$, and $Y^3$ in the formulae (II) and (III) are independently a member selected from the group consisting of a methyl group, an ethyl group, a propyl group, a butyl group, a pentyl group, a hexyl group, an isopropyl group, an isobutyl group, a cyclopropyl group, a cyclohexyl group, a phenyl group, a benzyl group, and a p-tolyl group; and further wherein n is an integer selected from the group consisting of 1 and 2.

20. The lithium battery as claimed in claim 13, wherein said alkyne derivative is at least one compound having the formula (I) selected from the group consisting of 2-pentyne, 1-hexyne, 2-hexyne, 3-hexyne, 1-heptyne, 1-octyne, 2-octyne, 4-octyne, 1-decyne, 1-dodecyne, phenylacetylene, 1-phenyl-1-propyne, 1-phenyl-1-butyne, 1-phenyl-1-pentyne, 1-phenyl-1-hexyne, diphenylacetylene, 4-ethynyltoluene and dicyclohexylacetylene.

21. The lithium battery as claimed in claim 13, wherein said alkyne derivative is at least one compound having the formula (II) selected from the group consisting of (a) when $Y^1$=—$COOR^5$, 2-propynylmethyl carbonate, 2-propynylethyl carbonate, 2-propynylpropyl carbonate, 2-propynylbutyl carbonate, 2-propynylphenyl carbonate, 2-propynylcyclohexyl carbonate, 2-butynylmethyl carbonate, 3-butynylmethyl carbonate, 2-pentynylmethyl carbonate and 1-methyl-2-butynylmethyl carbonate; (b) when $Y^1$=—$COR^5$, 2-propynyl acetate, 2-propynyl propionate, 2-propynyl butyrate, 2-propynyl benzoate, 2-propynylcyclohexyl carbonate, 2-butynyl acetate, 3-butynyl acetate, 2-pentynyl acetate and 1-methyl-2-butynyl acetate; and (c) when $Y^1$=—$SO_2R^5$, 2-propynyl methanesulfonate, 2-propynyl ethanesulfonate, 2-propynyl propanesulfonate, 2-propynyl p-toluenesulfonate, 2-propynyl cyclohexylsulfonate, 2-butynyl methanesulfonate, 3-butynyl methanesulfonate, 2-pentynyl methanesulfonate and 1-methyl-2-butynyl methanesulfonate.

22. The lithium battery as claimed in claim 13, wherein said alkyne derivative is at least one compound having the formula (III) selected from the group consisting of (a) when $Y^2$=—$COOR^6$ and/or $Y^3$=—$COOR^7$, 2-butyne-1,4-diol dimethyldicarbonate, 2-butyne-1,4-diol diethyldicarbonate, 2-butyne-1,4-diol diphenyldicarbonate and 2-butyne-1,4-diol dicyclohexyldicarbonate; (b) when $Y^2$=—$COR^6$ and/or $Y^3$=—$COR^7$, 2-butyne-1,4-diol diacetate, 2-butyne-1,4-diol dipropionate, 2-butyne-1,4-diol dibenzoate and 2-butyne-1,4-diol dicyclohexanecarboxylate; and (c) when $Y^2$=—$SO_2R^6$ and/or $Y^3$=—$SO_2R^7$, 2-butyne-1,4-diol dimethanesulfonate, 2-butyne-1,4-diol dipropanesulfonate, 2-butyne-1,4-diol di-p-toluenesulfonate and 2-butyne-1,4-diol dicyclohexanesulfonate.

23. The lithium battery as claimed in claim 13, wherein said alkyne carbonate derivative is at least one compound having the formula (IV), wherein $R^1$, $R^2$, $R^3$, and $R^4$ in the alkyne carbonate derivative (IV) are independently a member selected from the group consisting of a methyl group, an ethyl group, a propyl group, a butyl group, a pentyl group, a hexyl group, an isopropyl group, an isobutyl group, a cyclopropyl group, a cyclohexyl group, a phenyl group, a benzyl group, a p-tolyl group, and a hydrogen atom; and further wherein n is an integer selected from the group consisting of 1 and 2.

24. The lithium battery as claimed in claim 13, wherein said alkyne carbonate derivative is at least one compound having the formula (IV) selected from the group consisting of dipropargyl carbonate, di(2-butynyl)carbonate, di(3-butynyl)carbonate, di(2-pentynyl)carbonate, di(1-methyl-2-butynyl)carbonate and 2-propynyl-2'-butynyl carbonate.

\* \* \* \* \*